June 30, 1959

A. H. CANADA 2,892,378

INDICATING TURBIDIMETER

Filed April 26, 1955

*Inventor:*
*Alfred H. Canada,*
*by* Merton D. Moore
*His Attorney.*

United States Patent Office 2,892,378
Patented June 30, 1959

2,892,378

INDICATING TURBIDIMETER

Alfred H. Canada, Schenectady, N.Y., assignor to General Electric Company, a corporation of New York Application April 26, 1955, Serial No. 503,920

4 Claims. (Cl. 88—14)

This invention relates to a device for measuring the turbidity of a fluid, and more particularly to a turbidimeter which can be used to measure the turbidity of fluids which may be corrosive or extremely hot or cold.

It is frequently desired in industry to measure the turbidity of a fluid, turbidity being defined as the ratio of the light scattered in the fluid to that of the light transmitted through the fluid. This measurement is extremely important, for example, in the brewing industry where the measurement of the turbidity of the brew is vital, in sewage disposal processes where state laws require that the turbidity have a given value before the waste product can be disposed of, etc. In many of these processes in which turbidity measurements are important, the fluids under test may be corrosive and destructive of the turbidimeter instruments presently known in the art, or the fluids may be so hot or cold that the accuracy of the measuring instruments is affected. The fluids present in sewage disposal processes, for example, would eventually destroy a turbidimeter; similarly, the process by which soda ash is made out of salt brine would corrode a turbidimeter. There is, therefore, a need in the art for a turbidimeter which is not subject to corrosion in measuring such corrosive fluids and which is unaffected by extreme temperatures, and the present invention has made it possible to fulfill this need.

It is, therefore, one object of this invention to provide an indicating turbidimeter which will measure the turbidity of corrosive fluids without itself being subject to corrosion.

It is another object of this invention to provide an indicating turbidimeter for measuring the turbidity of fluids at extreme temperatures without being subject to inaccuracies.

Other objects and advantages will appear as the description of the invention proceeds.

In accordance with the invention, the ends of first and second light transmitting rods, made of a material that is not subject to corrosion, are placed within a fluid whose turbidity is being measured. A third light transmitting rod is disposed between the first and second rods with one end exposed to the fluid under test. Light is then sent down the length of the first rod, deflected through the fluid and caused to enter the second rod. Some light also enters the third rod and it serves to determine the light scattered in the fluid, while the light received by the second rod serves to measure the amount of light transmitted through the fluid. By alternately masking the remote ends of the second and third rods, the same indicator can be used to measure the light from both rods and thereby provide an indication of the turbidity of the fluid. Also, there is disclosed a novel electrical circuit and switching arrangement which simplifies the reading of turbidity by inserting different calibrated resistances across the indicator when the rods are alternately masked, the readings of the calibrated resistances enabling the turbidimeter to be direct reading.

The features of this invention which are believed to be novel and patentable are pointed out in the claims which form a part of this specification. For a better understanding of the invention, reference is now made to the accompanying drawing, wherein like parts are indicated by like reference numerals, in which:

Figure 1:
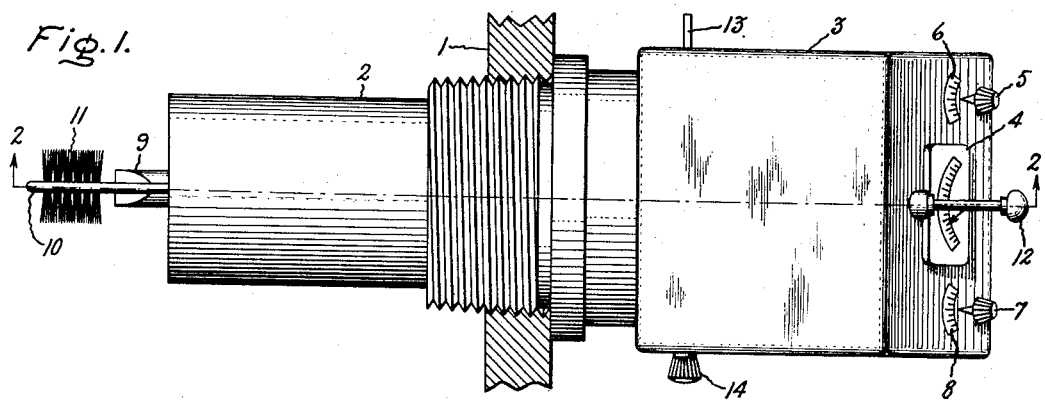
Fig. 1 is a perspective view of a turbidimeter made in accordance with the invention.

Referring now to Fig. 1, there is shown, in cross section, a wall 1 of a vessel or large flow pipe containing a fluid whose turbidity it is desired to measure. This wall has a threaded hole therein, enabling a threaded pipe 2 to be screwed into the wall and thereby fasten the turbidimeter of the invention thereto. This turbidimeter, in addition to the threaded pipe 2, comprises a chamber 3 attached to pipe 2 and having a wall upon which are mounted an electrical meter 4, such as a galvanometer, a knob 5 having a pointer thereon for indicating the position of the knob upon a scale 6, and a knob 7 also having a pointer thereon for indicating the position of this knob upon a scale 8.

Passing through chamber 3 and pipe 2 is a shaft 10 bearing a brush 11 at one end thereof and having a knob 12 at its other end. The purpose of this brush will be explained hereinafter. Also passing through chamber 3 is a shaft 13 adapted to be moved toward or away from the chamber by a knob 14. The purpose of this knob and shaft will also be explained hereinafter.

Figure 2:
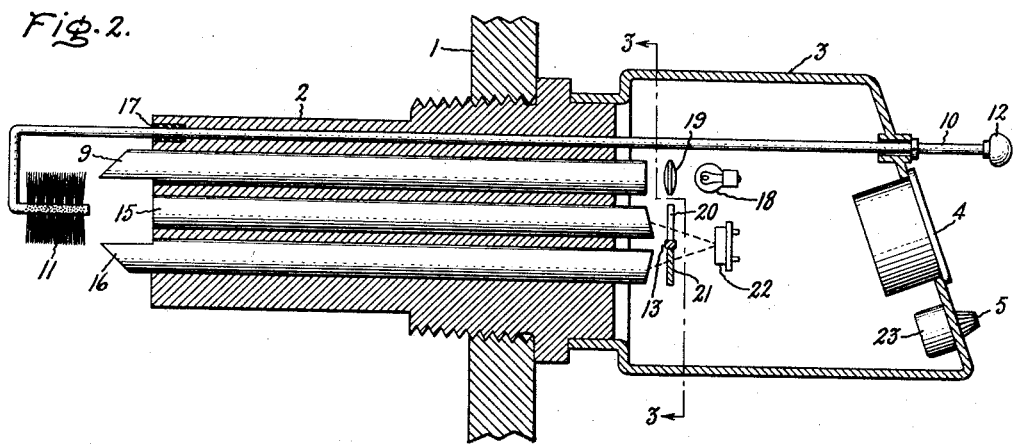
Fig. 2 is a cross-sectional view of the invention taken along line 2—2 of Fig. 1.

Referring now to Fig. 2, there is shown in cross section, a view taken along 2—2 of Fig. 2. As is seen from this view, shaft 10 passes through a fluid tight packing 17 at the end of pipe 2 that is disposed within the fluid, thus permitting shaft 10 to move back and forth without admitting fluid into the turbidimeter. There are also disposed within pipe 2 three light transmitting rods 9, 15 and 16. These rods may be made of quartz or glass, or any other corrosion resisting, light transmitting medium, and rods 9 and 16 have 45° angle cuts at their ends which enter the fluid whose turbidity is being measured. Before light transmitting rods 9 are disposed a source of light 18, illustrated as a light bulb, and a device 19, such as a lens, for focusing the light emanating from light source 18 at one end of rod 9.

Also disposed within chamber 3 and in front of rods 15 and 16 are a pair of masks or shutters 20 and 21 mounted upon the shaft 13, and a device 22, such as a photoelectric cell, for converting light from these rods into an electrical current. The ends of rods 15 and 16 within chamber 3 are cut at such an angle that they will project light in the direction indicated by the dotted lines against the surface of the photoelectric cell 22. In this figure, it is also seen that the knob 5 serves to turn the movable element of a potentiometer 23, the knob 7 serving to actuate a similar potentiometer 24 (which is not shown in this view but is illustrated in Fig. 4).

Figure 3:
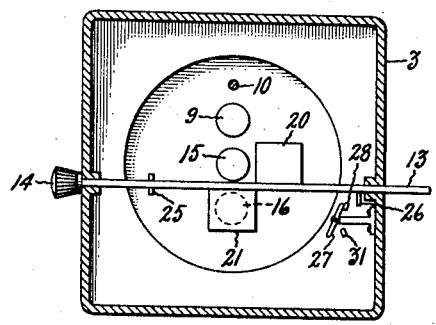
Fig. 3 is a cross-sectional view of the invention taken along line 3—3 of Fig. 2.

Referring now to Fig. 3, there is shown a cross-sectional view taken along line 3—3 of Fig. 2. In this view it is seen that rod 13 can be moved in and out so as to place either shutter 20 in front of rod 15 or shutter 21 before rod 16. The movement of shaft 13 is controlled by a projection 25 and knob 14, which limit the movement of the shaft. Shaft 13 has a projection 26 thereupon which serves to move a movable arm 27 against a contact 28 when the shaft is moved to the right, and against a contact 31 when the shaft is moved to the left. Simultaneously, by moving the shaft to the right, rod 16 is blocked by shutter 21, and by moving it to the left, rod 15 is blocked by shutter 20.

Figure 4:
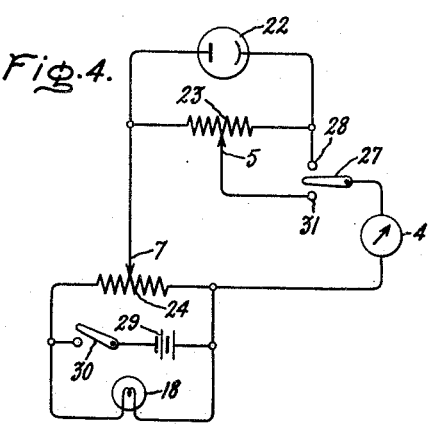
Fig. 4 is a circuit diagram of the indicating portion of the turbidimeter.

Referring now to Fig. 4, there is shown an electrical circuit that could be used to indicate the turbidity of a fluid within which the device shown in Figs. 1 to 3 is inserted. There is provided a source of direct current potential 29, such as a battery, connected in series with a switch 30, the series combination being connected in parallel across the potentiometer 24 and the light source 18. Also, the movable arm of potentiometer 24 is connected to switch contact 28 through the parallel circuit of the photoelectric cell 22 and the potentiometer 23. The center arm of the potentiometer 23 is connected to the switch contact 31 and switch movable arm 27 is connected through the meter 4 to one end of potentiometer 24.

Now is described the operation of the device shown in Figs. 1 to 4. The entire turbidimeter is first screwed into the wall of a chamber or pipe containing the fluid under test. Next the knob 14 (shown in Fig. 3) is pushed toward the chamber 3 of the turbidimeter, causing shutter 21 to block one end of rod 16 and switch arm 27 to touch contact 28. Then, switch 30 (shown in Fig. 4) is closed, placing an electrical potential across light source 18 and causing it to glow.

Referring now to Fig. 2, it is seen that light from the source 18 is concentrated by lens 19 at the right end of rod 9. This light travels down the length of rod 9 where it is caused to be reflected at right angles to the axis of the rod by the 45° cut at the left end of the rod. The reflected light then enters rod 16 where it is again reflected at right angles to travel down the length of this rod. However, the light emanating from this rod is blocked by shutter 21 and cannot affect the reading of the instrument. A portion of the light travelling between rods 9 and 16 through the fluid medium is scattered due to the turbidity of the fluid and enters rod 15. There it travels down the length of this rod until it leaves it at its right end and strikes photoelectric cell 22, where it produces an electrical indication of the amount of light scattered in the fluid.

Referring now to Fig. 4, it is apparent that with switch arm 27 on contact 28, changing the movable arm of potentiometer 23 does not have any effect on meter 4. However, varying knob 7 of potentiometer 24 will serve to balance out any potential from photoelectric cell 22, and this balance can be noted when galvanometer 4 reads zero. Also, referring to Fig. 1, the value of this balancing potential can be noted upon scale 8; and this serves as a measure of the amount of light scattered in the fluid.

Referring again to Fig. 3, knob 14 is then pulled to the left of the chamber 3 until stop 25 catches on the walls of the chamber. This places shutter 20 in front of rod 15 and removes shutter 21 from its position before rod 16. Simultaneously, switch arm 27 is removed from contact 28 by projection 26 and caused to touch contact 31. Since the right end of rod 16 is no longer blocked by shutter 21, the light transmitted through it and passing through the fluid medium from rod 9, is registered on photoelectric cell 22 and serves to produce an electrical indication of the amount of light transmitted through the fluid medium. Shutter 20 now prevents the scattered light in rod 15 from entering photoelectric cell 22, and therefore photoelectric cell 22 will only measure the amount of light transmitted through the fluid medium.

Referring again to Fig. 4, it is seen that when the amount of light transmitted through the fluid is being measured, switch arm 27 is on contact 31 and the voltage output from photoelectric cell 22 is no longer balanced by the voltage between the movable arm 7 of potentiometer 24 and the right end of this potentiometer. Therefore, by varying the movable arm 5 of potentiometer 23 until meter 4 again reads zero, the scale 6 (shown in Fig. 1) adjacent to the pointer on arm 5 serves to measure the balancing potential, and, hence, the amount of light transmitted through the fluid. The ratio between the readings of scale 8 and scale 6 is the direct indication of the turbidity of the fluid under test.

At periodic intervals, knob 12 of Fig. 2 may be pushed in and out to cause shaft 10 to bring brush 11 between the ends of rods 9 and 16 within the fluid medium, this motion of the shaft serving to clean the light transmitting surfaces of rods 9 and 16.

It should be understood that the reverse of the procedure outlined above could be followed in measuring turbidity by first measuring the light transmitted through the fluid medium and adjusting potentiometer 23 until the meter 4 read zero, and then measuring the scattered light by adjustment of potentiometer 24.

It should also be understood that the present invention is not limited to any particular kind of light transmitting rods since many such rods are known to the art. Nor is the present invention limited to any particular electrical circuit for measuring the light from the rods, since many other circuits will readily occur to those skilled in the art.

From the foregoing, it is believed apparent that there has been disclosed a novel type of indicating turbidimeter which can be used to measure the turbidity of corrosive as well as non-corrosive fluids. Moreover, this turbidimeter can also accurately measure the turbidity of extremely hot or extremely cold fluids, since the light transmitting rods can be made as long as is necessary to keep the measuring instruments from being affected by the temperature of the fluid under test.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What I claim as new and desire to secure by Letters Patent of the United States is:

1. An indicating turbidimeter comprising, a first light transmitting rod means having one end adapted to project into a fluid whose turbidity is being determined and having its other end receptive of light, a second light transmitting rod means having one end adapted to be inserted into said fluid, the one end of said first and second rod means being adapted to transmit light therebetween through said fluid, a third light transmitting rod means disposed between said first and second rod means with one end exposed to said fluid for transmitting down its length light scattered in said fluid, and means for measuring the light output from the other ends of said second and third rod means in order to determine the turbidity of the fluid under test.

2. An indicating turbidimeter comprising, a first light transmitting rod means having one end adapted to project into a fluid whose turbidity is being determined and having its other end receptive of light, a second light transmitting rod means having one end adapted to be inserted into said fluid, the one end of said first and second rods being adapted to transmit light therebetween through said fluid, a third light transmitting rod means disposed between said first and second light transmitting rod means with one end exposed to said fluid for transmitting down its length light scattered in said fluid, means for converting the light output from the other ends of said second and third light transmitting rod means into a pair of electrical signals representative of the light transmitted and scattered in said fluid, and means for providing a direct indication of the values of the electrical signals in order to indicate the turbidity of the fluid under test.

3. An indicating turbidimeter comprising, a first light transmitting rod means having one end adapted to project into a fluid whose turbidity is being determined and having its other end receptive of light, a second light transmitting rod means having one end adapted to be inserted into said fluid, the one end of said first and second rod means being adapted to transmit light therebetween through said fluid, a third light transmitting rod means disposed between said first and second rod means with one end exposed to said fluid for transmitting down its length light scattered in said fluid, photoelectric cell means disposed opposite the other ends of said second and third rod means, movable masking means positioned between the other ends of said second and third rod means and said photoelectric cell for selectively masking the other end of either said second and third rod means for converting the light output therefrom into a pair of electrical voltage signals, and a pair of calibrated means for respectively balancing out the respective voltage signals, the calibration marks providing a direct indication of the values of the electrical voltage signals and serving to provide a direct indication of the turbidity of the fluid under test.

4. An indicating turbidimeter comprising, a first light transmitting rod having one end adapted to project into a fluid whose turbidity is being determined and having its other end receptive of light, a second light transmitting rod having one end adapted to be inserted into said fluid, the one end of said first and second rods being adapted to transmit light therebetween through said fluid, a third light transmitting rod disposed between said first and second rods with one end exposed to said fluid for transmitting down its length light scattered in said fluid, a photoelectric cell disposed opposite the other ends of said second and third rods for converting the light output therefrom into a pair of corresponding electrical voltage signals with amplitudes proportional to the amount of said light output from each of said second and third rods, movable masking means disposed between said photoelectric cell and the other ends of said second and third rods for selectively masking the other end of either said second or said third rod from said photoelectric cell, first and second calibrated sources of voltage for respectively balancing out respective ones of the pair of voltage signals from said photoelectric cell, said first calibrated source being used to balance out the voltage signal derived from said second rod when said movable masking means masks said third rod and said second calibrated source serving to balance out the voltage signal derived from said third rod when said movable masking means masks said second rod, and means for indicating when said calibrated sources have balanced out said voltage signals, the calibration markings on said sources providing a measure of the values of the electrical signals and serving to provide a direct indication of the turbidity of the fluid under test.

References Cited in the file of this patent
UNITED STATES PATENTS

| | | |
|---|---|---|
| 1,648,369 | Svedberg et al. | Nov. 8, 1927 |
| 1,717,702 | Exton | June 18, 1929 |
| 1,828,894 | Freygang | Oct. 27, 1931 |
| 2,324,304 | Katzman | July 13, 1943 |
| 2,381,414 | Wilkie | Aug. 7, 1945 |
| 2,626,361 | Martine | Jan. 20, 1953 |

OTHER REFERENCES

"The Design of an Optical System for the Absolute Measurement of Turbidity" (Kremen and Shapiro), Journal of the Optical Society of America, vol. 44, number 6, June 1954, pages 500–501.